United States Patent [19]
Chiloff et al.

[11] Patent Number: 5,772,834
[45] Date of Patent: Jun. 30, 1998

[54] PLASTIC SUBSTRATE PRODUCTION PRODUCTION DEVICE

[75] Inventors: Serge Chiloff, Olivet; Jean-Marc Bernard, Chapelle Saint Mesmin; Gérard Nioche, Clery Saint Andre, all of France

[73] Assignees: Gilles Leroux, S.A., Loury; ATN S.A., Olivet, both of France

[21] Appl. No.: 851,081

[22] Filed: May 3, 1997

Related U.S. Application Data

[63] Continuation of Ser. No. 334,379, Nov. 3, 1994, abandoned.

[51] Int. Cl.⁶ .................................................. B32B 31/00
[52] U.S. Cl. .................. 156/351; 156/361; 156/495; 156/498; 156/522; 226/30
[58] Field of Search ..................................... 156/350, 351, 156/361, 494, 495, 498, 510, 516, 522; 226/27, 29, 30, 31, 44

[56] References Cited

U.S. PATENT DOCUMENTS

| | | | |
|---|---|---|---|
| 3,999,279 | 12/1976 | O'Neal et al. ............................. | 29/458 |
| 4,303,715 | 12/1981 | Chang .................................... | 29/852 X |
| 4,526,646 | 7/1985 | Suzuki et al. ........................... | 156/361 |
| 4,539,058 | 9/1985 | Burgess et al. ....................... | 156/350 X |
| 4,680,079 | 7/1987 | Tanaka .................................... | 156/353 |
| 4,693,778 | 9/1987 | Swiggett et al. ........................ | 156/361 |
| 5,094,708 | 3/1992 | Bechtel et al. .......................... | 156/351 |

FOREIGN PATENT DOCUMENTS

| | | | |
|---|---|---|---|
| 3064400 | 3/1988 | Japan ...................................... | 156/350 |
| 5-229014 | 9/1993 | Japan ...................................... | 156/350 |

*Primary Examiner*—David A. Simmons
*Assistant Examiner*—Paul M. Rivard
*Attorney, Agent, or Firm*—Nixon & Vanderhye

[57] ABSTRACT

This invention relates to a plastic substrate production process, the production device for such a substrate, and the use of the process for the production of integrated circuit boards. The plastic substrate production process is characterized in that it comprises the following steps: unwinding and straightening of a continuous strip of plastic which is slightly larger in dimension than one of the dimensions of the board; printing, at at least one printing station, of a series of printing patterns and of printed markings; driving of the strip at a regulated printing speed; detection of the difference in speed; cutting by a press of the strip at positions defined by the printed markings; and regulation of the printing speed as a function of the difference between the printing speed and the driving speed.

14 Claims, 3 Drawing Sheets

PLASTIC SUBSTRATE PRODUCTION PRODUCTION DEVICE

This is a continuation of application Ser. No. 08/334,379, filed Nov. 3, 1994 now abandoned.

This invention relates to a plastic substrate production process, the device making it possible to put the process into practice, as well as the use of the process for the production of microcircuit cards.

BACKGROUND OF THE INVENTION

It is known to produce plastic substrates for microcircuit cards according to a multilayer process or according to a single-layer process.

In the single-layer process, the cards are produced from large plates, on which a large number of cards are printed by an offset printing process, then each plate is cut into strips, and the strips are then cut to form the plastic substrates that have the dimensions of a card.

This process exhibits the drawback of having multiple operations involving picking up and transporting the plates, then the strips, and finally the cards.

Another process is known in which the cards are made in multiple layers from three strips, a first one of which constitutes the base layer, another constitutes the middle layer exhibiting regularly spaced cuts for positioning of the integrated chip, and a third strip constitutes the upper layer, which also features regularly spaced cuts to allow the positioning of the contact module. Once assembled, the three layers are then cut to the dimensions of a card.

This process exhibits the drawback of being complex at the level of the assembly of the various layers to constitute the plastic substrate and requires preprinting, either on the base layer, or on the upper layer, or on both layers at the same time, of the patterns to be made to appear on the card. This process poses the problem of the patterns coinciding in the case of double-face printing. In addition, it does not make it possible to obtain high production rates.

BRIEF DESCRIPTION OF THE INVENTION

A first object of the invention is therefore to propose a plastic substrate production process for semiconductor card which makes it possible to produce substrates requiring a minimum number of pick-up and transport operations from one station to the next; this process eliminates the problem of the patterns coinciding and also allows high production rates.

This object is attained by the fact that the production process for a plastic substrate is characterized in that it comprises the following steps:

unwinding and straightening of a continuous strip of plastic which is slightly larger in dimension than one of the dimensions of the card;

printing, at at least one printing station, of a series of printing patterns and of printed markings, each of which corresponds to the pattern of a card in at least one printing color;

driving of the strip at a regulated printing speed corresponding to the cutting speed of a cutting station located downstream from the printing station;

detection of the difference in speed;

cutting by a press of the strip at positions that are defined by the printed markings and at a rate of speed close to the maximum speed of the press;

regulation of the printing speed as a function of the difference in speed detected between the printing speed and the driving speed.

According to another characteristic, after the printing operation and before the cutting operation, the process comprises a drying operation.

According to another characteristic, the drying operation is achieved by two ultraviolet tubes placed on both sides of the strip for double-face printing.

According to another characteristic, the process for producing the plastic substrate comprises a step for depositing a layer of varnish to protect the printing before the ultraviolet drying step.

According to another characteristic, the process for producing the plastic substrate comprises a step for depositing a protective layer on each of the printed faces.

Another object of the invention is to propose a production device that puts the process into practice.

This object is attained by the fact that the production device comprises:

a substrate coil of a strip of plastic;
which is driven in rotation and delivers the strip onto a straightening device which drives the strip toward at least one printing station, at the exit of which is a drying station that is associated with means for driving the strip and means for detecting the difference in speed between the printing station and a cutting station located downstream.

According to another characteristic, each printing station comprises at least one printing device consisting of an inking roller that drives a plate-holding roller in contact with a blanket, with the inking roller working with a roller to laminate the ink film on the inking roller as a function of the relative speed of the inking roller and of the laminating roller, whereby each roller has a width approximately corresponding to one of the dimensions of the card, with the blanket roller being in contact with one side of the strip.

According to another characteristic, each printing station comprises on each side of the strip a printing device consisting of an inking roller that drives a plate-holding roller in contact with a blanket, with the inking roller working with a roller for laminating the ink film on the inking roller as a function of the relative speeds of the inking roller and the laminating roller, with each roller having a width approximately corresponding to one of the dimensions of the card, and with the two blanket rollers on each side of the strip being in contact with it.

According to another characteristic, the press comprises a punch matrix assembly; the punch, which is mounted on columns, is driven in displacement by an eccentric-crank-connecting rod system, with the strip being driven by an assembly composed of a driving roller and a pressing roller so as to bring the printed marking to a point opposite a photoelectric cell placed in the matrix.

According to another characteristic, the driving of the strip is ensured by two rollers, at least one of which is knurled on its two ends over a distance corresponding to the margin that separates the edge of the strip from the edge of the cut delimiting the card.

According to another characteristic, the printing station operates at a speed of less than 20 m/sec.

According to another characteristic, the cutting press operates at a speed of between 7,000 and 13,000 cards per hour.

Another object of the invention is to propose using the substrate production process to produce microcircuit cards.

This object is attained by the fact that the process for producing the substrates is used in combination with a microcircuit card production process in which the cut cards are picked up on one or more module insertion lines that operate at a speed that is less than the rate of speed for producing the plastic substrates, to perform the following steps:

milling the housing;

pre-encoding of the semiconductor microcircuits;

cutting and inserting of the modules composed of a semiconductor circuit mounted on a substrate forming contact areas;

encoding and checking of the cards.

According to another characteristic, the process comprises a counting step using a camera and a step of putting the cards in troughs.

BRIEF DESCRIPTION OF DRAWINGS

Other characteristics and advantages of this invention will come out more clearly on reading the following description made with reference to the accompanying drawings in which.

DETAILED DESCRIPTION OF PREFERRED EMBODIMENTS

Figure 1:
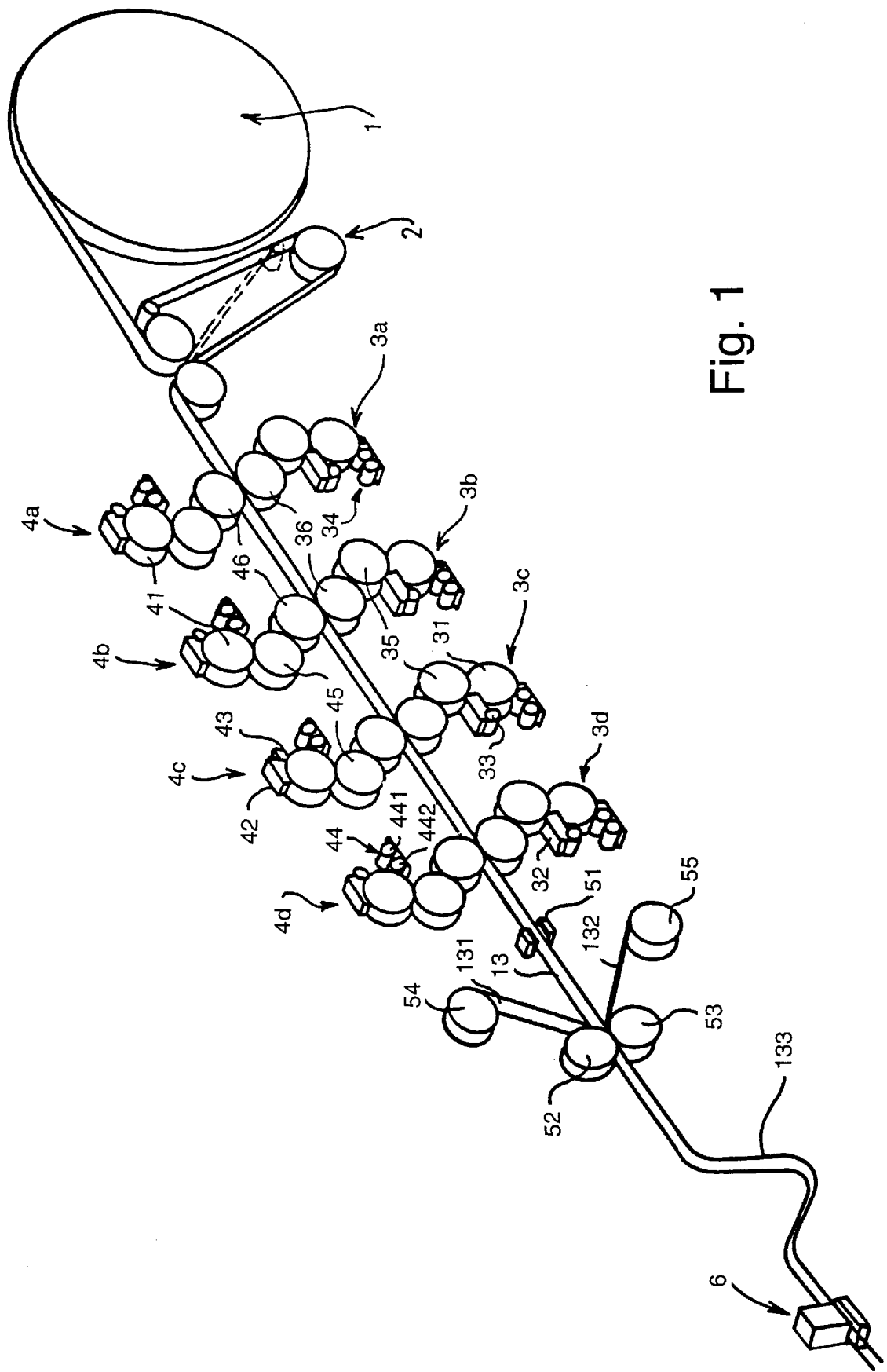
FIG. 1 presents an overall view of the plastic substrate production process.
Figure 3:
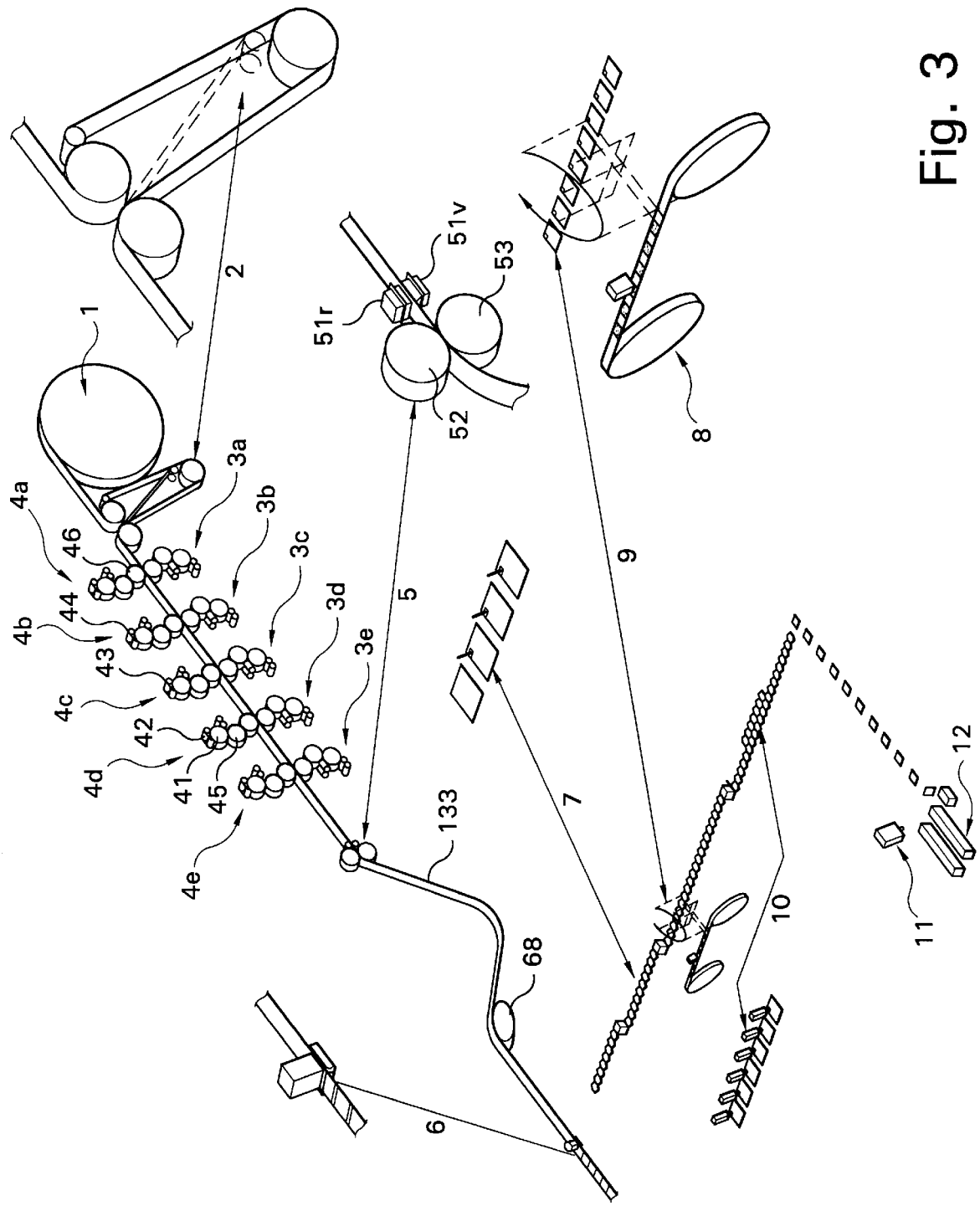
FIG. 3 depicts a second variant of the process for the production of plastic substrates that is used with a line for inserting the modules into the plastic substrates.

FIG. 1 shows the part of the device that forms the printing on the plastic substrate in the process for producing the plastic substrates which is used in FIG. 3 in combination with a line for module insertion.

The printing device of FIG. 1 consists of a roller (1) supporting a strip (13) of PVC with a thickness that is desirable for the plastic substrate of a card and with a width corresponding to the dimensions in width or in length of a card. This roller (1) delivers its strip (13) into a device (2) for straightening of the strip so as to eliminate the residual curvature that it could maintain after storage on a roller. Strip (13) then passes through a group of printing stations (4a, 4b, 4c, 4d) that is associated in the case where the printing is done on two faces with printing stations facing each other (3a, 3b, 3c, 3d), respectively. Each printing station consists of an ink duct (42), or (32), associated with a roller (43), or (33), for laminating the ink, and with an inking roller (41), or (31). The inking roller, which penetrates into the ink duct, is coated with ink, and the laminating roller (43 or 33) makes it possible, through regulation of its speed, to determine the thickness of the film that is uniformly distributed on the inking roller (41), or (31). This inking roller works with a plate-holding roller (45), or (35) which holds the plates on which the patterns to be printed have been engraved. The patterns to be printed correspond to the patterns to be made to appear on each of the faces of the card in the color corresponding to the printing station. With inking roller (41), or (31) is associated a damping unit (44), or (34), consisting of two rollers (441, 442), or (341, 342) that dip into a fountain filled with damping liquid and one (442), or (342) of which is in contact with the inking roller (41), or (31). Then the pattern is transferred onto the PVC strip (13) with a blanket roller (46) and respectively (36), for the printing device on the lower face. It is quite obvious that in the case where the printing is done on only a single face, each printing station will comprise only the printing device corresponding to the face which must be printed, and on the opposite face without a pattern a counter pressure roller will simply be used. The entire printing device is depicted with four stations so as to produce the various base colors that make it possible to print the various patterns of different color. On at least one printing station, at least one of the plate-holding rollers comprises, in addition to the pattern to be printed, the engraving of a printed marking which makes it possible to mark the position of the pattern forming the card.

On leaving the station of the printing device, printing strip (13) is subjected to a drying operation that is performed with two ultraviolet radiation lamps (51), one (51R) for the first face, and the other (51V) for the other side of the strip (13) in the case where there is double-face printing. If the printing is done on only the first face, only UV lamp (51R) will be used.

In a first variant embodiment, the drying device is followed by a group of four rollers, with two (52, 53) working with the strip by friction to drive it and to ensure that it is driven between the straightening device and the exit of the printing device. In the first variant, printed strip (13) also receives on each of its faces two strip layers (131, 132) which will be sealed or glued by ultrasound and which constitute protective "overlay" layers. This strips (131, 132) are delivered from two coils (54, 55) located on both sides of strip (13) in the case where it is double-face printed. If the strip is printed on a single face, only the coil corresponding to the printed side will be kept on the device. On leaving the driving station (52, 53), the strip (13) forms, as illustrated in FIG. 1, a loop (133) which makes it possible to determine the advance or the delay of the printing station in relation to the cutting station (6). At the cutting station, strip (13) is cut into a card, as will be explained below in light of FIG. 2.

In another variant embodiment of the printing station, shown in FIG. 3, to the series of stations (4a to 4d) constituting the printing devices for the colors necessary for the pattern is added an additional station (4e), or (3e), which makes it possible to deposit on each of the printed faces a film of varnish that acts as protection for the printing.

Figure 2A:
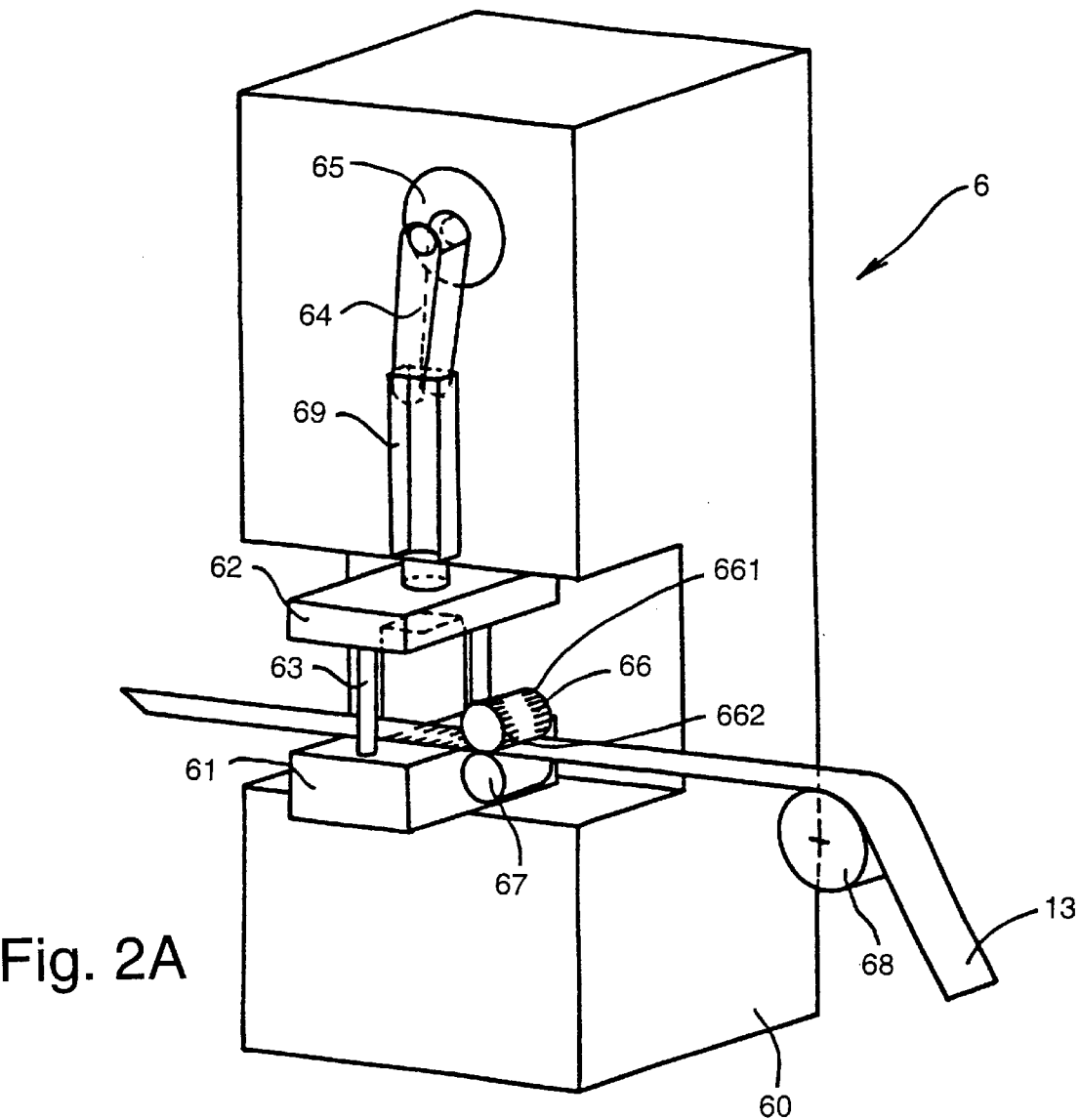
FIG. 2A shows a front view of the cutting device used in the process of FIG. 1.
Figure 2B:
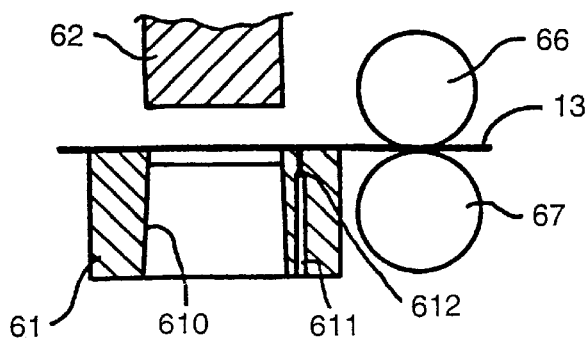
FIG. 2B shows a sectional view of the drive system, punches, and matrices of the cutting press.

The cutting station (6) shown in FIGS. 2A and 2B consists of a substrate (60) on which a matrix (61) is mounted that comprises columns (63) on which a punch (62) slides that is actuated by a connecting rod (69), crank (64), with eccentric (65) assembly being driven continuously by a motor. In the body of the matrix (61), a passage (611) makes it possible to position a photoelectric device (612) that ensures the detection of the printed markings that are printed near each representative pattern of the card. The detection of the marking ensures the positioning of the patterns opposite the punch to make possible the on-the-fly cutting and triggers the stopping of the driving of the strip (13), which is ensured by two rollers (66, 67) before the fall of the punch (62). At least one of these two rollers (66, 67) comprises on its border a knurling (661, 662) which creates a corresponding knurling on the edge of the strip. The size of this knurling and the size of the strip (13) are made such that the knurled parts will not be in the surface which will constitute hereinafter the board and which will be cut in the cutting station (6), illustrated in FIG. 1. A roller (68) placed upstream from the two drive rollers (66, 67) is either associated with a pantographic arm and a contact electric detection system, or with a photoelectric system, to make it possible to detect the size of the loop (133) formed on strip (13) between the exit from the drying device and the entry into the cutting device (6) of the production process. As a function of the size of this loop (133), the printing speed will be increased or decreased. When the loop (133) expands, the printing speed will increase, and when the loop (133) goes below a certain value, the speed of the printing stations (3, 4) will be reduced. This makes it possible to adapt the printing speed to the cutting speed of the tool (6), which can reach a speed of 10 to 11,000 boards per hour, while the printing device can reach a speed of 20 m/sec, which would require a tool having significantly higher rates of speed.

The cut cards leaving the press (6) are gathered in batches and transferred to an assembly line of the modular units, as shown in FIG. 3. This assembly line of the modules has a speed on the order of 3,000 cards per hour. It is therefore desirable to have several parallel lines. Each of the lines will comprise a device for milling of the housings (7) in which a milling assembly of the type of the one described in patent application Ser. No. 93 04072 filed in the name of Gilles LEROUX S.A. is used. This operation is followed by an operation for pre-encoding (8) of the chip. Then the chip is placed on a modular substrate, cut, and then inserted, as shown in step 9. The card, equipped with its integrated circuit module, is then brought to an encoding and checking assembly (10), is then transported on a conveyor to pass in front of a counting camera (11), and is then to be gathered in troughs at station (12).

It is understood that by using the specific printing system and the cutting tool associated with the tool for inserting of the microcircuits described above, high production rates are obtained, on the order of 10 to 11,000 cards per hour in the case where several parallel chip inserting lines fed by the same production line of plastic substrates are used.

Other modifications within the scope of a person skilled in the art are also part of the spirit of the invention.

We claim:

1. Plastic substrate production device, comprising:
   a substrate coil of a strip of plastic;
   a straightening device;
   at least one printing station for printing a pattern on said strip;
   a drying station located at an exit of said printing station;
   driving means for driving the strip through said straightening device, at least one printing station and drying station;
   cutting means located downstream of said driving means;
   detecting means for detecting a printed marking on said strip to position a pattern opposite said cutting means; and
   means for detecting the difference in speed between the printing station and said cutting means.

2. Plastic substrate production device comprising:
   means for unwinding and straightening a continuous strip of plastic slightly larger in dimension than a dimension of a card;
   means for printing in at least one color a series of printing patterns and printed markings on said strip, each printing pattern corresponding to a pattern of a card;
   cutting means located downstream of said printing means for cutting said strip at positions defined by said printed markings;
   driving means for driving the strip at a regulated printing speed corresponding to a cutting speed of said cutting means;
   first detecting means for detecting the difference in printing speed and cutting speed;
   second detecting means for detecting a printed marking on said strip to position a pattern opposite said cutting means;
   means for regulating the printing speed as a function of the difference in speed detected between the printing speed and the driving speed.

3. Plastic substrate production device according to claim 2, wherein said means for drying is situated after the printing operation and before the cutting operation.

4. Plastic substrate production device according to claim 3, wherein the drying means comprises two ultraviolet tubes placed on both sides of the strip for double-face printing.

5. Plastic substrate production device according to claims 2, further comprising means for depositing a layer of varnish to protect the printing before the ultraviolet drying means.

6. Plastic substrate production device according to claims 1, further comprising a means for depositing a protective layer on each of the printing faces.

7. Plastic substrate production device according to claim 1, wherein each printing station comprises at least one printing device made of an inking roller that drives a plate-holding roller in contact with a blanket, whereby the inking roller works with a roller for laminating roller, with each roller having a width approximately corresponding to one of the dimension of the card and with the blanked roller being in contact with one side of the strip.

8. Plastic substrate production device according to claim 7, wherein each printing station comprises on each side of the strip a printing device consisting of an inking roller that drives a plate-holding roller in contact with a blanket, with the inking roller working with a roller for laminating the ink film on the inking roller as a function of relative speeds of the inking roller and of the laminating roller, whereby each roller has a width corresponding approximately to one of the dimensions of the card, with the two blanket rollers, on each side of the strip being in contact with it.

9. Plastic substrate production device according to claim 2, wherein said cutting means includes a press comprising a punch mounted on columns, a matrix assembly and a photoelectric cell located in said matrix; the punch being driven in displacement by an eccentric and crank connecting rod system, and wherein the strip is driven by an assembly comprising a driving roller and a pressing roller whereby a printed marking is positioned opposite said photoelectric cell.

10. Plastic substrate production device according to claim 9, wherein said strip is driven by two rollers, at least one of which is knurled on its two ends over a distance corresponding to a margin separating an edge of the strip from an edge of a cut delimiting the card.

11. Plastic substrate production device according to claim 10, wherein the printing station operates at a speed of less than 20 m/sec.

12. Plastic substrate production device according to claim 10, wherein the cutting press operates at a speed of between 7,000 and 13,000 cards per hour.

13. Production device according to claim 1, comprising:
    means for picking up micro unit modules comprising a semi-conductor circuit mounted on a substrate forming contact area from a module insertion line that operates at a speed which is less than the speed of a plastic substrates production device as defined in claim 15;
    means for milling a housing in cards produced by said plastic substrates production device as defined in claim 15;
    means for cutting and inserting of a said module in a said housing; and
    means for encoding and checking said semiconductor microcircuits.

14. Plastic substrate production device according to claim 13, comprising a counting means and means for putting the cards in troughs.

* * * * *